(12) United States Patent
Erhart et al.

(10) Patent No.: US 11,624,489 B2
(45) Date of Patent: Apr. 11, 2023

(54) METHOD FOR PRODUCING A BLINKER MODULE, BLINKER MODULE, REAR-VIEW DEVICE, AND MOTOR VEHICLE

(71) Applicant: MOTHERSON INNOVATIONS COMPANY LIMITED, London (GB)

(72) Inventors: Volker Erhart, Stuttgart (DE); Eugen Meier, Ditzingen (DE); Oliver Schmidt, Stuttgart (DE); Ilka Rötzer, Kemnath (DE); Andrew Thompson, Portchester (GB); James Dickson, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/133,763

(22) Filed: Dec. 24, 2020

(65) Prior Publication Data

US 2021/0116096 A1 Apr. 22, 2021

Related U.S. Application Data

(63) Continuation-in-part of application No. PCT/EP2019/066269, filed on Jun. 19, 2019.

(30) Foreign Application Priority Data

Jun. 19, 2018 (DE) ...................... 10 2018 115 693.6

(51) Int. Cl.
*F21S 43/235* (2018.01)
*B29D 11/00* (2006.01)
(Continued)

(52) U.S. Cl.
CPC ...... *F21S 43/235* (2018.01); *B29D 11/00692* (2013.01); *B60Q 1/0017* (2013.01);
(Continued)

(58) Field of Classification Search
CPC ..... F21S 43/235; F21W 2103/25; B60Q 1/32; B60Q 1/34; B60Q 1/06; B60Q 1/0017; B60R 1/1207
See application file for complete search history.

(56) References Cited

U.S. PATENT DOCUMENTS

2011/0235353 A1   9/2011  Fukasawa et al.
2015/0167917 A1*  6/2015  Takahashi ............... F21S 43/27
                                                  362/520
(Continued)

FOREIGN PATENT DOCUMENTS

DE   102004048669 A1   5/2005
DE   202005014268 U1  12/2005
(Continued)

OTHER PUBLICATIONS

International Search Report dated Oct. 10, 2019 of International application No. PCT/EP2019/066269.
(Continued)

*Primary Examiner* — Julie A Bannan
(74) *Attorney, Agent, or Firm* — Jones Day

(57) ABSTRACT

A method for manufacturing a blinker module for a rearview device of a motor vehicle includes the steps of providing at least one lighting element comprising at least one light guide and at least one light disk or lens and providing of at least one illuminant unit comprising at least one illuminant, wherein the illuminant unit is designed to couple light emitted by the illuminant into the lighting element. A blinker module, rearview device and motor vehicle, including the blinker module manufactured according to the method, are also described.

16 Claims, 6 Drawing Sheets

(51) Int. Cl.
*B60Q 1/00* (2006.01)
*B60Q 1/32* (2006.01)
*B60Q 1/34* (2006.01)
*B60R 1/06* (2006.01)
*B60R 1/12* (2006.01)
*F21W 103/25* (2018.01)

(52) U.S. Cl.
CPC .................. *B60Q 1/32* (2013.01); *B60Q 1/34* (2013.01); *B60R 1/06* (2013.01); *B60R 1/1207* (2013.01); *F21W 2103/25* (2018.01)

(56) References Cited

U.S. PATENT DOCUMENTS

| | | | | |
|---|---|---|---|---|
| 2018/0010760 A1* | 1/2018 | Juris | .......................... | B60Q 1/28 |
| 2018/0029529 A1* | 2/2018 | Iseki | ..................... | F21S 43/245 |
| 2019/0353321 A1* | 11/2019 | Wasilewski | ........... | F21S 43/243 |

FOREIGN PATENT DOCUMENTS

| | | |
|---|---|---|
| DE | 102004054732 A1 | 5/2006 |
| DE | 102012211822 A1 | 5/2014 |
| DE | 102016207964 A1 | 3/2017 |
| DE | 102016212527 A1 | 1/2018 |
| WO | WO 2020/002108 A | 1/2020 |

OTHER PUBLICATIONS

Written Opinion dated Oct. 10, 2019 of International application No. PCT/EP2019/066269.
Extended European Search Report dated Jun. 9, 2022 of European application No. 21213146.0.

* cited by examiner

METHOD FOR PRODUCING A BLINKER MODULE, BLINKER MODULE, REAR-VIEW DEVICE, AND MOTOR VEHICLE

CROSS-REFERENCE TO RELATED APPLICATIONS

This application is a continuation-in-part of International Patent Application No. PCT/EP2019/066269, filed Jun. 19, 2019, which claims the benefit of priority to German Patent Application No. DE102018115693.6, filed Jun. 28, 2018, each of which is hereby incorporated by reference in its entirety for all purposes.

BACKGROUND

1. Field of the Invention

The present disclosure refers to a method for manufacturing a blinker module. The disclosure also relates to a blinker module which can be manufactured or produced by such a method, a rearview device with such a blinker module and a motor vehicle with such a rearview device.

2. Related Art

Blinker modules are known from the state of the art in many ways. These are integrated within a housing of the rearview device. More and more often, blinker signals are used which have two spatially separated light regions. The first light region serves primarily as a design feature, which gives the rearview device and the vehicle comprising this rearview device a high-quality appearance. The second light region is intended to meet legal requirements regarding the illumination in compliance with regulations. These two spatially separated lighting regions are realized in different ways. In a first variant, two separate illuminant units are used, each of which fulfills the aforementioned tasks. In a second variant only one single illuminant unit is used. The housing forms an opaque section, i.e. a cover, between the recesses provided for the two lighting regions, so that the single illuminant unit behind this section or cover appears to be divided into two parts.

For example, from DE 10 2004 046 322 B4, an exterior rearview mirror for motor vehicles with a mirror housing in which a mirror glass is adjustably arranged and a blinker light is accommodated, the blinker light having at least one illuminant and a transparent cover element covering the illuminant and inserted into an opening in the mirror housing, wherein the mirror housing has a web interrupting the opening and the cover element is provided with a recess in the region of the web and passes under the web, the entire cover element being flush with the outer surface of the mirror housing and having an angle of 5° to 6° in the region opposite to the direction of travel.

Even though the well-known blinker modules have proven themselves in the past, there is still the desire to be able to design the lighting regions and in particular the trim more freely and more cost-effectively, especially with regard to shape and color. In particular, it is desired that different designs of the opaque section are possible for different series, for example to provide manufacturer emblems or to meet other design requirements. In addition, the assembly of the blinker modules should also be further simplified in order to be able to comply with the ever shorter cycle times during assembly.

From DE 10 2008 044 357 A1, a vehicle lamp with at least one transparent element, with at least one main illuminant, the emitted light of which passes substantially perpendicularly through the optical interfaces of the at least one transparent element, is known, characterized in that the at least one transparent element has at least two optical regions with different optical refractive indices adjacent to each other at the at least one optical interface, and at least in one of the adjacent optical regions whose refractive index is higher than the refractive index of the adjacent optical region, the light of at least one illuminant is coupled in via at least one light coupling point in a direction substantially along the at least one optical interface, and the introduced light is coupled out via at least one light coupling point.

U.S. Pat. No. 6,441,943 B1 concerns a vehicle lamp assembly comprising a housing and an LED lamp contained within the housing. A signal mirror includes a mirror; and an LED lamp. The LED lamp contains a heat extraction element.

DE 10 2004 048 669 relates to external positioned side mirror units joined to the front struts of the vehicle which are assembled of a transparent or translucent housing with an extension leading to the body and the mirror element integrated in an opening pointing to the rear of the vehicle. A row of diodes positioned at the inner surface of the housing and supplied with power by cables guided through the extension illuminates the mirror through a gap in the border and indicates the presence of the mirror to a pedestrian or a driver located behind the vehicle.

DE 10 2012 211 822 further relates to a housing element for a lamp unit for a motor vehicle, comprising a housing shell made of thermoplastic material, which housing shell defines an interior space for accommodating a number of light sources of the signal lamp unit and a number of light conducting means associated therewith, wherein the housing shell can be produced by an injection molding method in which a light-permeable window section is formed, is to be developed in such a wayin such a way that an aesthetically pleasing and cost-effective housing unit can be achieved in the overall impression. This is achieved in that the number of light guide means is obtained in one piece with the housing shell during the injection moulding process. The invention further relates to a method for producing a housing element, which comprises a simple, cost-effective and continuous production method with an unrestricted advantageous aesthetic effect of the visible surface of the housing unit.

From DE 10 2016 207 964 an exterior mirror for a motor vehicle is known, which comprises at least one light guide into which the light of at least one light source can be coupled and can be decoupled again in order to realize at least one light function via at least one light exit surface, wherein the light exits the exterior mirror through at least one opening of an exterior mirror housing. According to the invention, the light guide is completely or at least almost completely covered with at least one coating. In this way, a separate housing for the light guide can be saved, wherein the light guide is nevertheless well protected.

US 2011/0235353 teaches a vehicle lamp which is formed using a light guide body. Thus light can be emitted without increasing the number of components. The structure has a light guide part formed on a light guide member. The light guide part emits light in an elongated shape by irradiating a first light-emitting diode provided on one end of the light guide part in the longitudinal direction. A projecting part projects reward on the rear face of the light guide part, which is the light-emitting face. A light emission suppressing part is provided on the projection end face of the projecting part and has a metal film formed by vapor deposition.

SUMMARY

In an aspect, blinker module is provided which is simple and inexpensive to manufacture and easy to handle in assembly and also offers great freedom in the design of the individual elements.

In an aspect, a method for manufacturing a blinker module for a rearview device of a motor vehicle includes the steps: providing at least one lighting element comprising at least one light guide and at least one light disk or lens; and providing of at least one illuminant unit comprising at least one illuminant, wherein the illuminant unit is designed to couple light emitted by the illuminant into the lighting element. There is a further step of at least one of arranging at least one first coating element on the lighting element, wherein the first coating element is designed as a reflector layer and is arranged on at least one first surface region of the light disk; and arranging at least one second coating element on the first coating element, the second coating element being designed as a first cover and/or opaque design element and being arranged on at least one second surface region of the first coating element, the first surface region and the second surface region having edges which are at least partially flush with one another at least in some regions, wherein at least one of the shape of the first design element, the color of the first design element and a pattern on the first design element is suited to be adapted to a rearview device casing to provide the impression of a two-part blinker module. As alternative or in addition to the further step, there is a step of arranging at least one insert between the at least one light guide and the at least one light disk or lens, the at least one insert being designed as a second cover and/or opaque design element, wherein at least one of the shape of the second design element, color of the second design element and a pattern on the second design element is suited to provide at least one of a logo, an emblem, a flag, a symbol and an information, wherein the screen insert is attached to a blinker module housing.

Thus, a first method for manufacturing a blinker module for a rearview device of a motor vehicle comprises the following steps: providing at least one lighting element comprising at least one light guide and at least one light disk; providing at least one illuminant unit comprising at least one illuminant, wherein the illuminant unit is designed to couple light emitted by the illuminant into the lighting element; arranging at least one first coating element on the lighting element, wherein the first coating element is designed as a reflector layer and is arranged on at least one first surface region of the light disk; and arranging at least one second coating element on the first coating element, the second coating element being designed as a cover and/or opaque element and being arranged on at least one second surface region of the first coating element, the first surface region and the second surface region having edges which are at least partially flush with one another at least in some regions.

Because the first coating element is formed as a reflector layer, a homogeneous illumination of the lighting element is realized and/or the loss of light intensity of light propagating in the lighting element is avoided, at least reduced, preferably to avoid and/or reduce (i) the emission of light from the lighting element at the location of the first coating element within the first surface region, and/or (ii) the absorption of light from the lighting element on the second coating element.

The fact that the second coating element is designed as a cover and possibly also as an opaque element means that it can interact in a suitable manner with at least one housing of the rearview device, in particular in order to achieve a flush closure between cover and/or opaque element on the one hand and housing on the other hand, at least in some regions.

A second method for manufacturing a blinker module for a rearview device of a motor vehicle differs from the first one by substituting the design element provided by the first and second coating elements by making usage of an insert arranged between a light guide and the lens. The insert offers an easy way to provide the blinker module with a design feature pointing to the car manufacturer, like an emblem, logo or flag. Many other possible imprints on such an insert are possible and the concept of interposing said insert within the blinker module offers a large variety of design alternatives.

Of course it is also possible according to the disclosure to combine the first and second method such that there is not only the design possibility offered by the first and second coating elements but also those offered by the insert. This is in particular useful when arranging the light pipe along a larger part of the circumference of the scalp of the rear view device.

It is particularly proposed that the providing of the lighting element includes the step: forming the light guide and the light disk by means of injection molding, especially in a single step and/or as a single element.

It may also be provided that the placement of the first coating element on the lighting element includes the step and/or steps: forming the first coating element on the lighting element by means of casting and/or molding and/or applying the first coating element on the lighting element by means of spraying, steaming, gluing, painting and/or injecting.

It is also advantageously possible for the first coating element to be arranged at least partially directly on the first surface region and/or for at least one intermediate element, in particular at least one further coating element, to be arranged at least partially between the first coating element and the lighting element, and/or the first coating element completely surrounds at least a region of the light guide.

It is also proposed that the arranging of the second coating element on the first coating element includes the step and/or steps: forming the second coating element on the first coating element by casting and/or molding and/or applying the second coating element on the first coating element by spraying, steaming, gluing, painting and/or injecting.

It is also proposed with the disclosure that the second coating element comprises and/or consists of at least one exposed element at least in regions, wherein the exposed element preferably has a rectangular, triangular, square, polygonal, star-shaped, circular, oval, ellipsoidal, parabolic, cylindrical and/or semicircular cross-section in at least one cross-sectional plane perpendicular to at least one direction of extension, in particular main direction of extension, of the exposed element.

It may also be proposed that the first coating element and the second coating element have different colors.

It may also be provided that at least one end section and/or middle section of the lighting element, in particular of the light guide and/or the light disk, has or have at least one tapered section.

With the latter design, it is advantageous that the first surface region and the second surface region extend at least partially along the tapered section.

With the latter two designs, it is also advantageous that the first coating element and/or the second coating element completely enclose the tapered section at least in some regions.

It is also proposed that the elements from the group comprising the lighting element, light guide, light disk, first coating element and second coating element are formed integrally with each other.

Furthermore, it may be advantageous that the step of providing at least one illuminant unit comprises providing the at least one illuminant in the form of at least one LED, at least one optical system, preferably at least one lens and/or at least one reflector, at least one electrical connection means for connecting the illuminant unit to an electrical current and/or voltage network, preferably to at least one on-board network, and/or at least one circuit board, preferably the illuminant unit being designed to couple light emitted by the illuminant into the lighting element, in particular the light guide.

It may also be proposed that the providing of the lighting element, the arranging of the first coating element and/or the arranging of the second coating element is carried out by means of one-component injection molding and/or multi-component injection molding, in particular two-component injection molding and/or three-component injection molding.

The method may be characterized by providing a housing to which at least one of the illuminant unit and the lighting element is attached.

At least the at least one circuit board of the illuminant unit may be attached to the housing.

The second coating element may be arranged on the first coating element facing away from the housing.

The at least one insert may be attached to the housing.

The at least one insert may be arranged to at least one of overlapping at least partly, an end portion of or a middle portion of the light guide, extending along the contour of at least one edge or side of the light guide along the light propagation direction starting from the illuminant unit, being slotted along the contour of at least one edge or side of the light guide along the light propagation direction starting from the illuminant unit, and covering or screening at least the at least one illuminant.

Further, the at least one insert may be attached to the housing at least along the contour of at least one edge or side of the light guide along the light propagation direction from the illuminant unit at least along one side of the light guide.

The at least one insert may be attached to the housing below the lower side of the light guide and extends along the upper side of the light guide.

The at least one insert may be attached to the housing by means of at least one of welding, spraying, steaming, gluing, painting and/or injecting.

The least one of the light guide and the insert at least along a part of the extension along the light propagation direction starting from the illuminant unit taper in the direction of the illuminant unit.

The object is solved according to a second aspect by a blinker module manufactured and/or manufacturable with a method according to the first aspect, wherein the light guide fulfils the blinker function and the first and/or second design elements, light disk and/or lens is designed to meet design requirements.

The object is solved in accordance with a third aspect by a rearview device for a motor vehicle comprising an upper casing, a lower casing and at least one blinker module in accordance with the second aspect, wherein the at least one blinker module is attached between the upper and the lower casing or to the upper casing.

At least one of the second coating element and the outer lens may cooperate in a fitting manner with at least one of the upper casing, the lower casing and a bezel of the rearview device.

There may be a flush closure between at least one of the second coating element and the lens on the one hand and at least one of the upper casing, the lower casing and the bezel on the other hand, at least in regions.

The object is solved according to a fourth aspect by a motor vehicle comprising at least one rearview device according to the third aspect.

The disclosure is thus based on the surprising realization that a blinker module can be manufactured particularly easily and cheaply, in the first method, if a first coating element is directly applied to the lighting element and a second coating element is applied to this in turn. Thus the inventors recognized that the second coating element can be designed as a cover and can be provided directly with the module in an advantageous way. This means that the cover no longer has to be provided on the casing or housing of the rearview device. This in turn means that one and the same basic shape of the housing can be used for a variety of different designs of blinker modules, since the variable element in the shape of the cover is not part of the housing but of the blinker module. Thus, on the one hand, the housing can be produced in high volume and thus more cost-effectively. On the other hand, the second coating element can also be produced at a lower cost, since its manufacture represents a separate method step in the production of the blinker module and can therefore, if necessary, be carried out independently of the other steps in terms of time and space. This means that even smaller series can be produced comparatively inexpensively according to individual specifications. In each case, the shape and color of the second coating element in particular can be adapted to the respective requirements. This is particularly easy and cost-effective if the second coating element is formed by injection molding, as this is very versatile.

The inventors also recognized the effective interaction of first and second coating elements. By taking over their own functions, the two coating elements could each be designed specifically for their task. The first coating element prevents radiation, i.e. light, from escaping from the lighting element in an region where it would not be visible from the outside anyway. Alternatively or in addition, the first coating element also prevents radiation or light from the lighting element from being absorbed by the second coating element. In both cases the light would be lost to the lighting element. Thus, the first coating element provides sufficient light intensity in all regions of the lighting element and additionally for an at least largely homogeneous illumination of the lighting element. In addition, this also results in a division of the blinker module into two effective light regions. The second coating element provides for a more extensive, individual design of the blinker module and an optimal interaction with the housing of the rearview device as well as for further optimization of the impression of a two-part blinker module.

Surprisingly, the fact that the second coating element forms part of the cover also made it easier to install the blinker module. It is no longer necessary to correctly position several individual illuminant units within the housing of the rearview device, or to align a single illuminant unit with the cover region previously formed by the housing. Rather, the blinker module can be placed as a whole, including the cover, from the rear against the inner surface of the housing. In other words, the blinker module is provided as a compact and complete component, making it easier to install.

The inventors also realized that additional design features are needed in a handy manner to allow for all kind of individualization of blinker modules of rearview devices. By printing any kind of information logo, emblem, symbol or the like on an insert arranged between the light guide and the lens all possible esthetic features and information can be transferred.

Many other design features might be added to a rearview device of the present disclosure. One astonishing perception of the invention is, that more or less any kind of logo, emblem, flag or the like can be printed on an insert between the light guide and an outer lens.

All possible combinations of design features provided via the outer coating and/or the insert are possible and provide a multitude of esthetic highlights of a rearview device in particular pointing to a car manufacturer.

For the purpose of this disclosure, the expression "arranging element X on element Y" means that the element X is arranged above the element Y. For this purpose, the element X can directly rest on element Y, but does not have to. Further elements can also be arranged at least partially between element X and element Y, in particular sandwich-like. In order to have element X on top of element Y, element Y must either rest directly on element X or be in indirect contact with element X through other elements. In other words, a glass is arranged on a table even if there is a coaster between the glass and the table. However, when the glass hovers over the coaster, it is no longer arranged on the table in the sense of the terminology of this disclosure.

BRIEF DESCRIPTION OF THE DRAWINGS

Further features and advantages of the disclosure result from the following description, in which embodiments of the disclosure are explained by means of schematic drawings and diagrams. They show with FIG. 1 is a schematic partial exploded representation of a blinker module according to a first embodiment of the disclosure;

FIG. 5b is a cross-section taken along the line AA of FIG. 5a;

FIG. 8b is an enlargement of a part of FIG. 8a;

DETAILED DESCRIPTION

Figure 1:
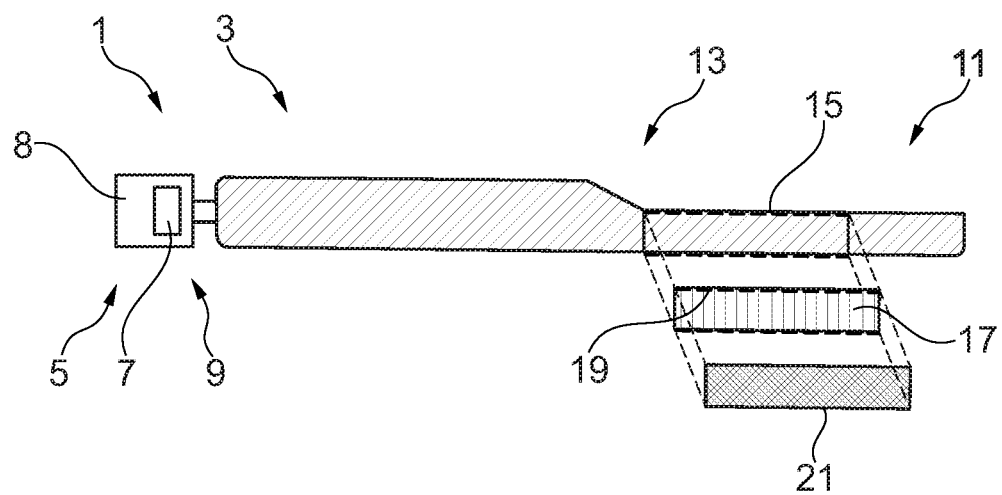

FIG. 1 shows a blinker module 1 according to a first embodiment of the disclosure, in a partial exploded representation.

The blinker module 1 comprises a lighting element 3, which has a light guide with a light disk that is an integral part of it. The blinker module 1 further comprises a illuminant unit 5, which has at least one illuminant 7, for example in the form of an LED, which is arranged on a circuit board 8. The light emitted by the illuminant unit 5 is coupled into the light guide at a first end 9 of the lighting element 3 and then propagates in the light guide. By means of the light disk, a planar illumination impression along the light guide is achieved. The schematic view in FIG. 1 is shown from the direction of oncoming traffic. The lighting element 3 has a flat front part (in FIG. 1 in the drawing plane). However, any other surface shapes are also possible.

In an end section 11 of the lighting element 3, which is opposite the first end 9, the lighting element 3 tapers in the course of a transition region 13 from a first, for example vertically wide, extension to a second, for example vertically narrower, extension.

The transition region 13 is followed by a first surface region 15 of the lighting element 3. In FIG. 1, this first surface region 15 is represented by a dashed rectangle. The first surface region 15 completely surrounds the lighting element 3. In FIG. 1, however, only the part of the first surface region 15 of the front part of the lighting element 3 is visible. A first coating element 17 is arranged on the first surface region 15. The first coating element 17 is arranged directly on the lighting element and is designed as a reflector layer. The latter has the purpose that light propagated within the lighting element 3, especially within the light guide, from the first end 9 towards the opposite end cannot escape from the lighting element 3 in the region of the first surface region 15. Instead, in the region of the first surface region 15, the light is reflected back into the lighting element through the reflector layer. This ensures that sufficient light intensity is available for the part of the end section 11 located to the right of the first surface region in FIG. 1. This divides the lighting element 3 into a first light region (in FIG. 1 left of the first surface region 15) and a second light region (in FIG. 1 right of the first surface region 15). The lower loss of light intensity in the lighting element 3 caused by the first coating element 17 leads to a homogeneous, or at least more homogeneous, illumination of the lighting element 3.

On a second surface region 19 (which coincides with the first coating element 17 shown in FIG. 1) of the first coating element 17, a second coating element 21 is directly arranged. While the first coating element 17 circumferentially surrounds the lighting element 3, the second surface region 19 only covers a part of the region of the first surface region 15, namely the part on the front of the lighting element 3, because the second coating element 21 no longer needs to prevent light from escaping from the lighting element 3 and/or the light from the lighting element 3 can be absorbed by the second coating element 21. The function of preventing or at least reducing this is assumed by the first coating element 17 according to the disclosure. Rather, it serves to form a cover in order to be able to interact with a casing of a rearview device in a suitable manner. For this purpose, the second coating element 21 is designed as an exposed element in the form of a cuboid in order to achieve a flush finish. The expansion of the exposed element is perpendicular to the drawing plane of FIG. 1 and is not shown in FIG. 1.

Figure 2:
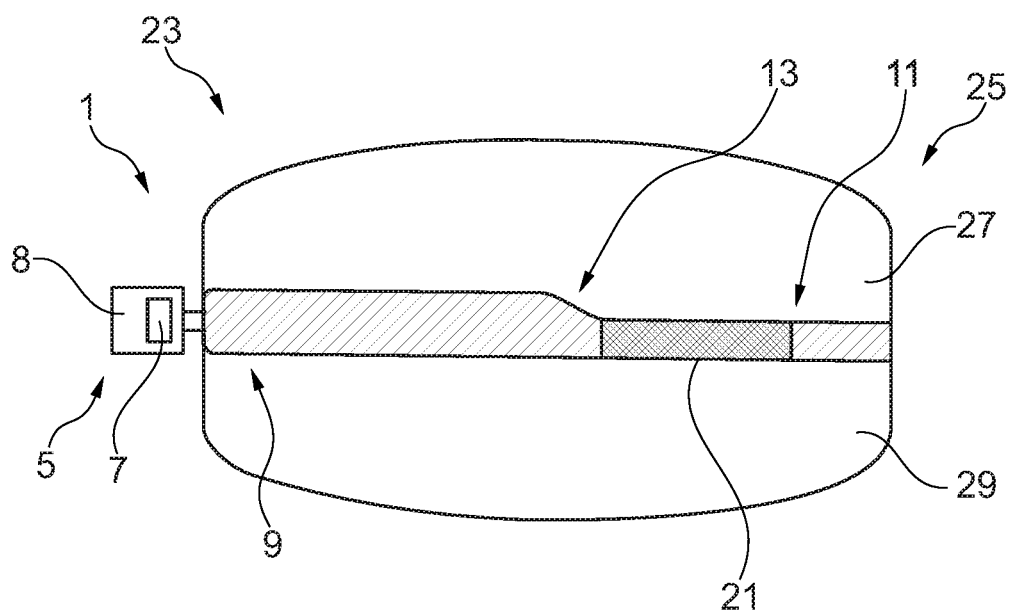
FIG. 2 is a schematic representation of an inventive rearview device with the blinker module according to FIG. 1.

FIG. 2 shows a rearview device 23 according to the disclosure in a schematic representation. The rearview device 23 is shown from the direction of oncoming traffic, i.e. with the side facing away from the driver.

The rearview device 23 includes a blinker module, in particular a blinker module 1 as described above in relation to FIG. 1. Therefore, for better understanding, identical elements of the blinker module used in FIG. 2 as those of blinker module 1 in FIG. 1 are also marked with identical reference signs. The blinker module is mounted from inside the casing 25 of the rearview device 23. The housing 25 comprises at least one upper casing 27, also called scalp, and at least one lower casing 29, also called saber. The second coating element 21 is flush with the upper and lower casings 27, 29 at the top and bottom. In addition, almost any configuration of the second coating element 21 can be made as long as the blinker module 1 can only be arranged within the housing 25 of the rearview device 23.

Figure 3:
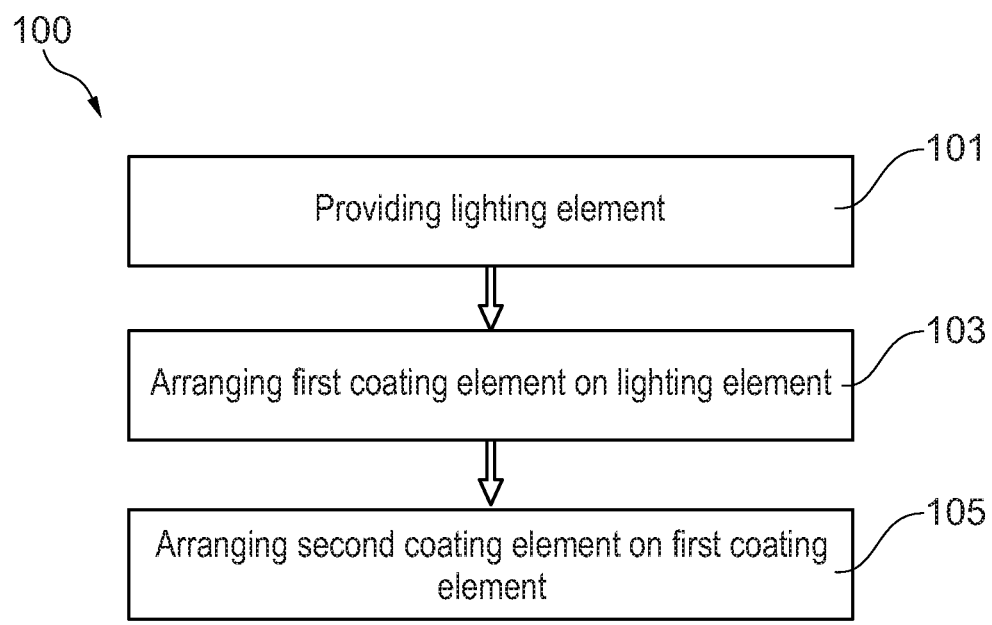
FIG. 3 is a flow chart of a method for producing the blinker module of FIG. 1.

FIG. 3 shows a flowchart 100 of an method according to the disclosure.

In one step 101, a lighting element, in particular a lighting element 3, is provided. This comprises a light guide and a light disk. The providing of the lighting element includes the step of forming the lighting element by injection molding. Both the light guide and the light disk are formed in one piece.

In a step 103, a first coating element, in particular the first coating element 17, is arranged on the lighting element on a first surface region, in particular the first surface region 15, of the lighting element. The arranging of the first coating element includes the step of forming the first coating element on the lighting element by injection molding. In other words, the first coating element is injection-molded onto the lighting element formed in step 101 in the first surface region and thus formed on the one hand and arranged directly on the lighting element on the other.

In a step 105, a second coating element, in particular the second coating element 21, is placed on the first surface element on a second surface region of the first surface element. The arranging of the second coating element includes the step of forming the second coating element on the first surface region by injection molding. In other words, the second coating element is injection-molded onto the first surface element formed in step 103 in the second surface region and thus formed on the one hand and arranged directly on the first surface element on the other hand.

In the following, with reference to FIGS. 4 to 5b, an alternative blinker module 50 of the present invention is described.

Figure 4:
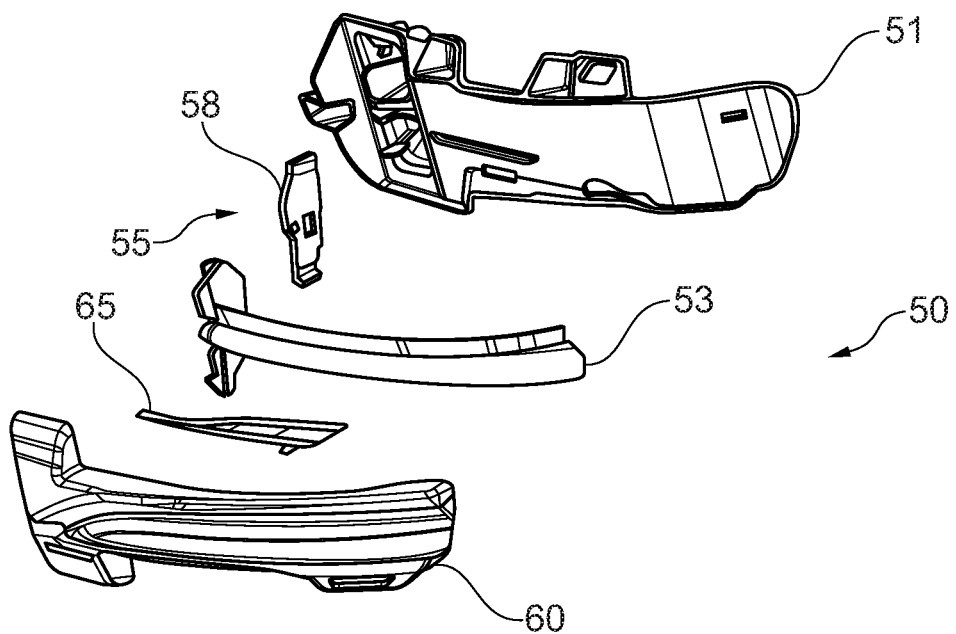
FIG. 4 is an exploded representation of a blinker module according to a second embodiment of the disclosure.

Turning to FIG. 4, the blinker module 50 comprises a housing 51 to which a circuit board 58 of an illuminant unit 55 and an outer lens 60 is to be attached, in particular in order to provide a sealed module. For that purpose a gasket may be arranged between the lens 60 and the housing 51 or the lens 60 may be welded to the housing 51. Between the lens 60 and the housing 51, are a light guide 53 and an inserter or inner cover 65. The light guide 53, the insert 65 and the lens 60 together provide a lightening element.

Figure 5A:
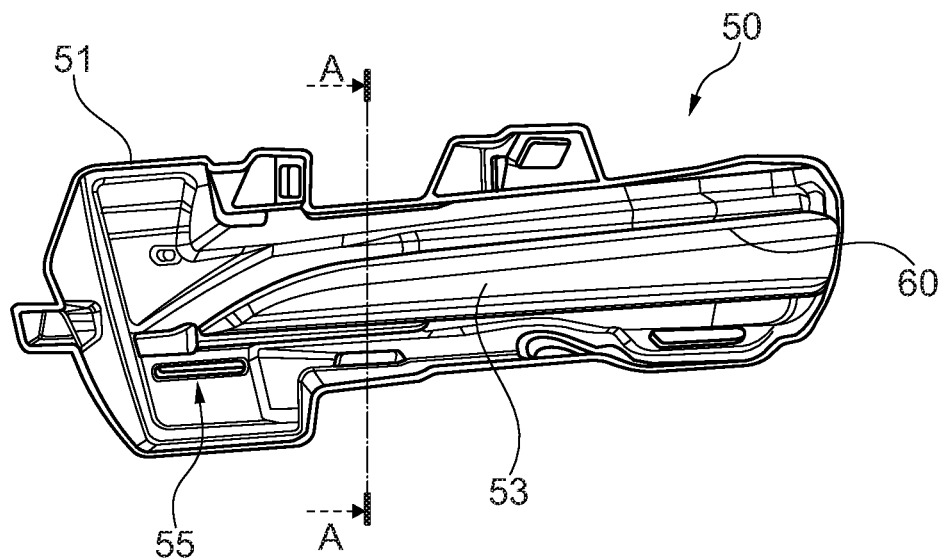
FIG. 5a is a front view on the blinker module of FIG. 4.
Figure 5B:
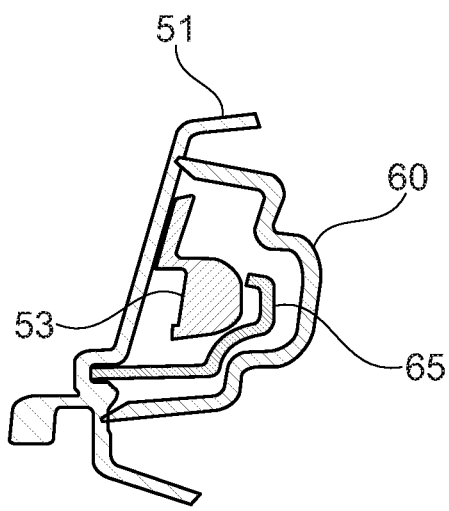

In FIGS. 5a and 5b the relative arrangement of the parts of the blinker module 50 can be seen. In particular, it can be seen in FIG. 5b that the insert 65 partly overlaps the light guide 53 and is attached to the housing 51. In addition, the light guide 53 also engages the housing 51.

Figure 6:
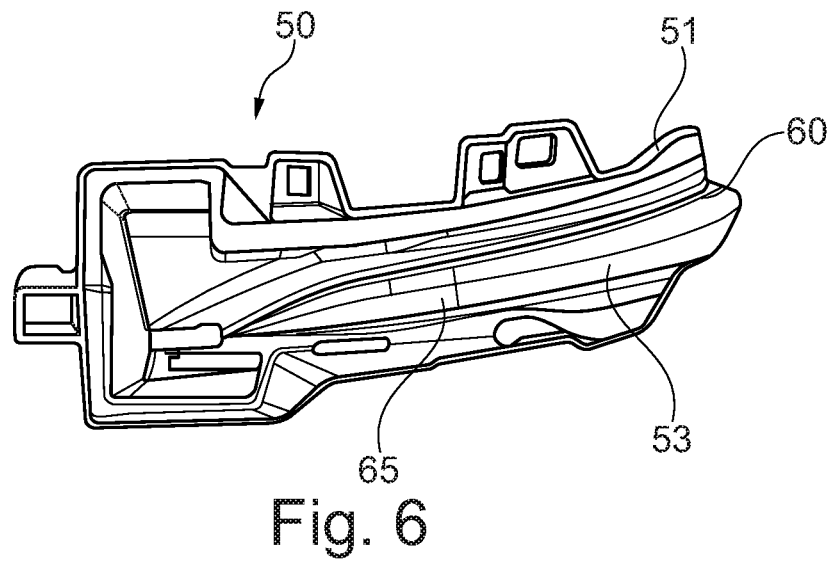
FIG. 6 is an isometric view of the blinker module of FIG. 4.
Figure 7:
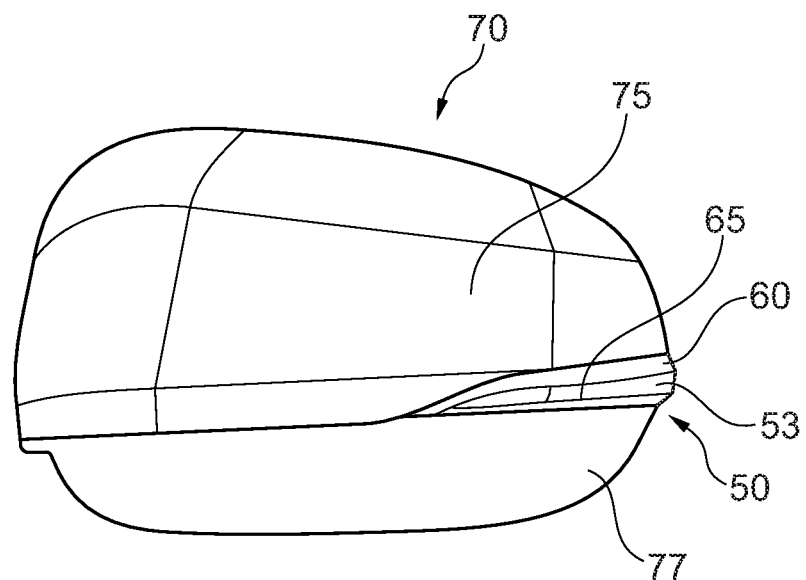
FIG. 7 is a perspective view of a rearview device with the blinker module of FIG. 4.

The circuit board 58 may carry two LED as illuminants, which emit light into the light guide 53. The light guide 53 may be provided with vertical radiator bar optics. The lens 60 may be formed out of crystal clear PMMA with no optics. The housing 51 may be black, in particular gloss polish. The insert 65 can be provided as a gloss black screen into which an emblem, logo or like, as shown for example in FIGS. 6 and 7, is printed. Thus, the insert 65 may be black in the inside, facing the light guide 53, in order to cover the light guide 53 such that no illumination will pass the insert 65 with its imprint. Accordingly, the imprint can only be seen at day light, but not at night, even when light is emitted into the light guide 53.

The flag or any other pattern may be provided on the insert 65 by pad printing. Such a printing process is especially facilitated by the fact that the insert 65 is provided with a mail geometry on the side facing the lens, allowing a mass production in cost saving manner.

FIG. 6 provides an isometric view of the assembled blinker module 50, which is bent in adaption to the contour of the scalp of a rearview device 70 as can be better seen in FIG. 7. The insert 65 is only arranged at one end of the light guide 53 and does not follow the same around the scalp of the rearview device 70.

FIG. 7 shows the arrangement of the blinker module 50 within the scalp, that is between an upper casing 75 and a lower casing 77. The blinker module 50 extends along a part of the circumference of the scalp in order to function as a blinker, that is as a side turn indicator, and as a design element by providing a design feature in form of the Italian flag which is printed on the insert 65.

Figure 8A:
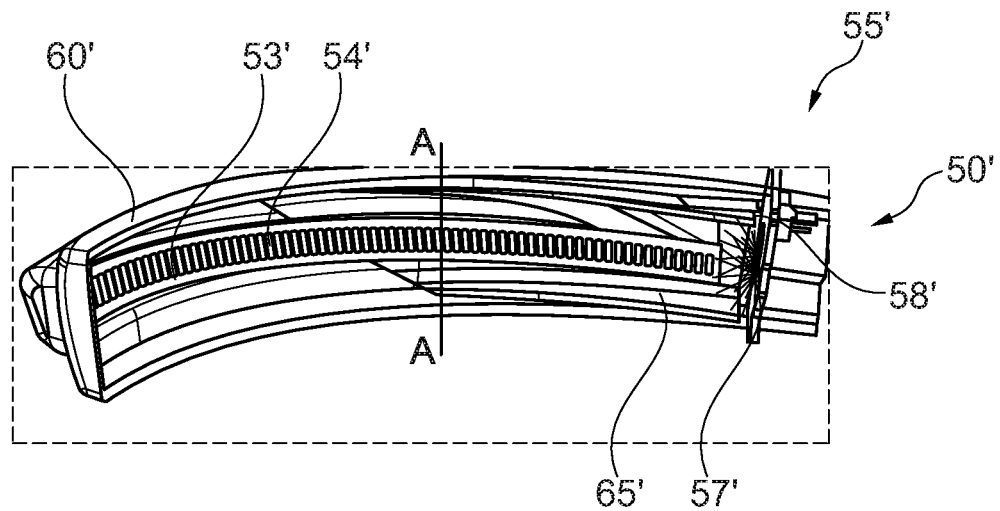
FIG. 8a is a rear view on a part of a blinker module according to a third embodiment of the disclosure, with the housing being detached.
Figure 8B:
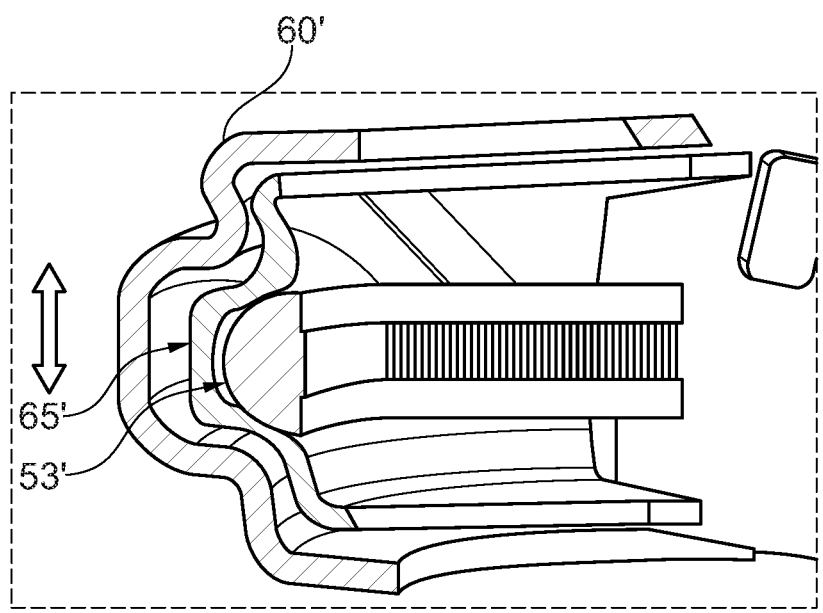

FIGS. 8a and 8b show a third embodiment of a blinker module, being an alternative to the blinker module 50 and similar parts are provided with the same reference number hyphenated.

Turning now to FIG. 8a, it can be seen that two illuminants 57' in form of LEDs are provided on a printed circuit board 58' in order to emit light into the light guide 53' provided with a texture 54' in form of radiator bar optics to enhance homogeneity of the illumination along the path from the illuminants 57' to the opposite end of the light guide 53. The light being reflected within the light guide 53' is further propagating until said opposite end of the light guide 53' in order to fulfill the blinker function.

At the end next to the illuminants 57' an insert 65' is arranged between the light guide 53' and the outer lens 60'. Said insert 65' is carrying an imprint of the Italian flag on the side facing the outer lens 60' such that the blinker module 50' fulfills a further design feature, namely displaying the Italian flag in case the illuminants 57 are switched off.

The position of the insert 65' and the flag thereon can be offset 1 mm to the outer lens 60', in order to avoid a direct contact. This gap is important for the manufacturing proses, in particular when the lens 60' is welded to the housing.

Figure 9A:
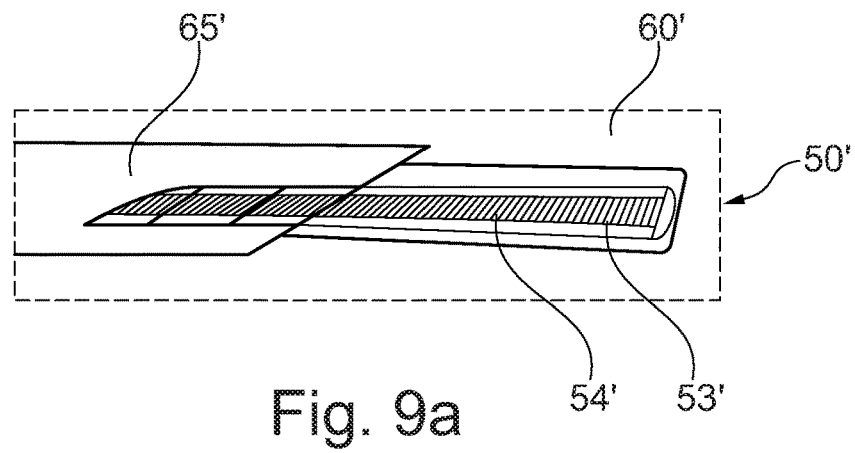
FIG. 9a is an isometric view of a part of the blinker module of FIGS. 8a and 8b installed in a rearview device, with a first insert.

With respect to FIGS. 9a to 9c different insert geometries are described in the following:

FIG. 9a shows the design discussed with respect to FIGS. 8a and 8b using a relative large insert 65'. Such an insert 65' can be attached to the housing (not shown in FIG. 9a) in the area around the light pipe 53'.

Figure 9B:
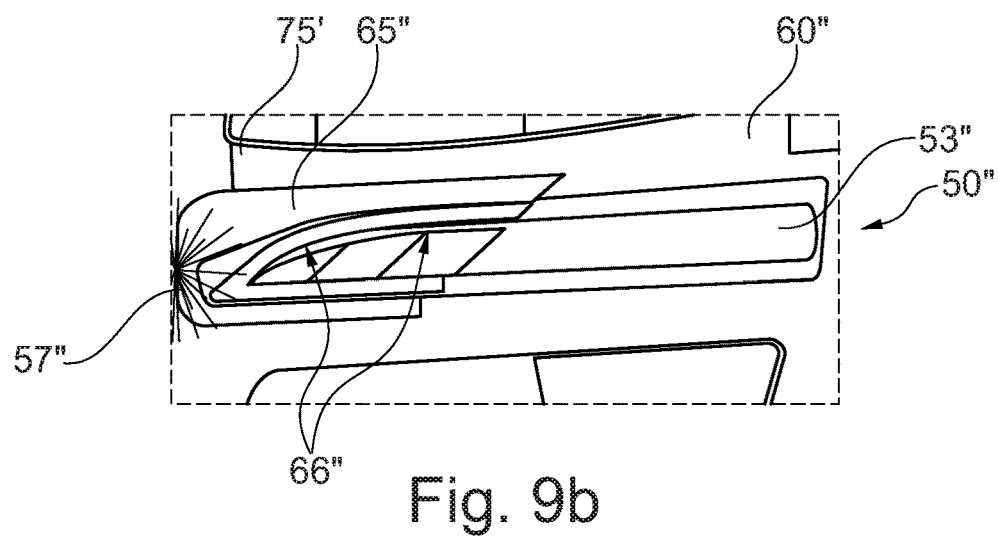
FIG. 9b is a view similar to FIG. 9a, but with a second, slotted insert.

In the alternative of FIG. 9b, the insert 65" is provided with a slot 66" along the upper contour or edge of the light guide 53" at the end facing the illuminants 57" such that light passes through the slot 66" and the outer lens 60' along the light guide 53" as an additional design feature, when the illuminants are switched on.

Thus, even in case it is dark outside, the flag on the insert 65" can be seen when the light guide 53" is illuminated.

The insert 65" can be attached to the housing (not shown) above and below the light guide 53".

Figure 9C:
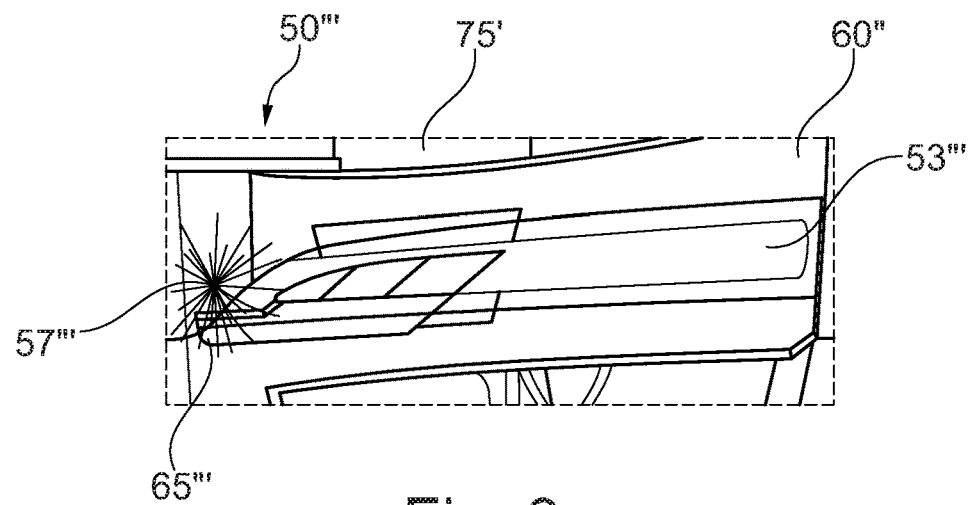
FIG. 9c is a view similar to FIG. 9a, but with an insert of reduced size.

Turning now to FIG. 9c, the insert 65' has a reduced size in order to just reach the upper edge of the light guide 53" for allowing more light to pass the lens 60''' above the flag on the insert 65', while no light passes below the flag, as the insert 65' is attached to the not shown housing below the light guide 53".

Thus, FIG. 9a provides an insert 65' as a full cover of the light guide 53' in the flag area to prevent flag illumination. The modified insert 65" of FIG. 9b is provided with a tapering slot for additional shielding of stray light just allowing a sharp illumination of the contour of the light guide 53", whereas FIG. 9c shows an embodiment with a floating flag suspended from a lower section only, such that the illumination along the upper edge of the light guide 53" is more profound.

The different blinker modules described above provide a variety of design features which can be combined in any possible manner in order to allow a car manufacturer to individualize its rearview devices.

The features disclosed in this description, the claims and the figures may be essential for the disclosure in its different embodiments both individually and in any combination with one another.

REFERENCE SIGN LIST

1 blinker module
3 lighting element
5 illuminant unit
7 illuminant
8 circuit board
9 end
11 end section
13 transition region
15 first surface region
17 first coating element
19 second surface region
21 second coating element
23 rearview device
25 housing
27 casing
29 casing
50, 50', 50", 50''' blinker module
51 housing
53, 53', 53", 53''' lighting guide
54' texture
55, 55' illuminant unit
57', 57", 57'''' illuminant
58, 58' circuit board
60, 60', 60", 60''' lens
65, 65', 65", 65''' insert or inner cover
66" slot
70 rearview device
75, 75' casing
77 casing
100 flowchart
101, 103, 105 method steps

What is claimed is:

1. A method for manufacturing a blinker module for a rearview device of a motor vehicle comprising the steps:

providing at least one lighting element comprising at least one light guide and at least one light disk or lens;

providing of at least one illuminant unit comprising at least one illuminant, wherein the illuminant unit is designed to couple light emitted by the illuminant into the lighting element; and arranging at least one insert between the at least one light guide and the at least one light disk or lens, the at least one insert being designed as a cover or opaque design element, wherein at least one of the shape of the cover or opaque design element, color of the cover or opaque design element and a pattern on the cover or opaque design element is suited to provide at least one of a logo, an emblem, a flag, a symbol and an information as an imprint on the at least one insert, wherein the at least one insert is attached to a blinker module housing, and wherein the at least one insert covers the at least one light guide such that substantially no illumination will pass the at least one insert with its imprint so that the imprint can only be seen in daylight.

2. The method according to claim 1, wherein providing the lighting element comprises the step of forming the light guide and the light disk or lens by at least one of injection molding, in a single step, and as a single element.

3. The method according to claim 1, wherein at least one end section or middle section of the lighting element has at least one tapered section.

4. The method according to claim 1, wherein the step of providing at least one illuminant unit comprises providing at least one illuminant in the form of at least one LED, providing at least one electrical connection means for connecting the illuminant unit to an electrical current or voltage network, and providing at least one circuit board, wherein the illuminant unit is designed to couple light emitted by the illuminant into the lighting element or the light guide.

5. The method according to claim 1, further comprising providing a housing to which at least one of the illuminant unit and the lighting element is attached.

6. The method according to claim 5, wherein at least the at least one circuit board of the illuminant unit is attached to the housing.

7. The method according to claim 5, wherein the at least one insert is attached to the housing.

8. The method according to claim 1, wherein the at least one insert is arranged to at least one of:

overlapping at least partly, an end portion of or a middle portion of the light guide, extending along the contour of at least one edge or side of the light guide along the light propagation direction starting from the illuminant unit, being slotted along the contour of at least one edge or side of the light guide along the light propagation direction starting from the illuminant unit, and covering or screening at least the at least one illuminant.

9. The method according to claim 8, wherein the at least one insert is attached to the housing at least along the contour of at least one edge or side of the light guide along the light propagation direction from the illuminant unit at least along one side of the light guide.

10. The method according to claim 9, wherein the at least one insert is attached to the housing below the lower edge or side of the light guide and extends along the upper side of the light guide.

11. The method according to claim 1, wherein the at least one insert is attached to the housing by means of at least one of welding, spraying, steaming, gluing, painting and/or injecting.

12. The method according to claim 1, wherein at least one of the light guide and the insert at least along a part of the extension along the light propagation direction starting from the illuminant unit taper in the direction of the illuminant unit.

13. A blinker module manufactured by a method according to claim 1, wherein the light guide fulfils the blinker function and at least one of the cover or opaque design element, the light disk and the lens is designed to meet design requirements.

14. A rearview device for a motor vehicle comprising:
an upper casing;
a lower casing; and
at least one blinker module according to claim 12,
wherein the blinker module is attached between the upper and the lower casings or to the upper casing.

15. The rearview device of claim 14, wherein a flush closure between the cover or lens on the one hand and at least one of the upper casing, the lower casing and a bezel of the review device, on the other hand, at least in regions.

16. A motor vehicle, comprising at least one rearview device according to claim 14.

* * * * *